United States Patent
Yamakawa et al.

(10) Patent No.: US 6,315,522 B1
(45) Date of Patent: Nov. 13, 2001

(54) HELICOPTER BLADE AEROFOIL AND HELICOPTER BLADE

(75) Inventors: Eiichi Yamakawa; Akihiko Tsuchihashi; Kenjiro Inagaki, all of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/511,802

(22) Filed: Feb. 23, 2000

(30) Foreign Application Priority Data

Feb. 23, 1999 (JP) .................................................. 11-045196

(51) Int. Cl.$^7$ ...................................................... B63H 1/26
(52) U.S. Cl. ..................... 416/223 R; 416/238; 416/242; 416/DIG. 5
(58) Field of Search ................................ 416/223 R, 242, 416/243, 238, DIG. 2, DIG. 5

(56) References Cited

U.S. PATENT DOCUMENTS

| | | |
|---|---|---|
| 4,314,795 | 2/1982 | Dadone . |
| 4,744,728 | 5/1988 | Lednicer et al. . |

(List continued on next page.)

FOREIGN PATENT DOCUMENTS

| | | |
|---|---|---|
| 50-102099 | 8/1975 | (JP) . |
| 59-134096 | 8/1984 | (JP) . |
| 62-34600 | 7/1987 | (JP) . |

(List continued on next page.)

*Primary Examiner*—Edward K. Look
*Assistant Examiner*—Ninh Nguyen
(74) *Attorney, Agent, or Firm*—Wenderoth, Lind & Ponack, L.L.P.

(57) ABSTRACT

Upper and lower faces of a helicopter blade aerofoil are defined by the following coordinates.

TABLE 1

| X/C | Yup/C | Ylow/C |
|---|---|---|
| 0.00000 | 0.00000 | 0.00000 |
| 0.00100 | 0.00511 | −0.00584 |
| 0.00250 | 0.00843 | −0.00813 |
| 0.00500 | 0.01218 | −0.01014 |
| 0.00750 | 0.01505 | −0.01136 |
| 0.01000 | 0.01747 | −0.01218 |
| 0.01250 | 0.01959 | −0.01277 |
| 0.01500 | 0.02150 | −0.01328 |
| 0.01750 | 0.02325 | −0.01375 |
| 0.02000 | 0.02487 | −0.01415 |
| 0.02500 | 0.02780 | −0.01483 |
| 0.05000 | 0.03891 | −0.01714 |
| 0.07500 | 0.04682 | −0.01862 |
| 0.10000 | 0.05291 | −0.01979 |
| 0.15000 | 0.06152 | −0.02206 |
| 0.20000 | 0.06666 | −0.02470 |
| 0.25000 | 0.06892 | −0.02729 |
| 0.30000 | 0.06895 | −0.02949 |
| 0.35000 | 0.06841 | −0.03109 |
| 0.40000 | 0.06744 | −0.03211 |
| 0.45000 | 0.06568 | −0.03270 |
| 0.50000 | 0.06301 | −0.03272 |
| 0.55000 | 0.05943 | −0.03211 |
| 0.60000 | 0.05498 | −0.03084 |
| 0.65000 | 0.04968 | −0.02883 |
| 0.70000 | 0.04349 | −0.02600 |
| 0.75000 | 0.03649 | −0.02237 |
| 0.80000 | 0.02886 | −0.01794 |
| 0.85000 | 0.02087 | −0.01315 |
| 0.90000 | 0.01279 | −0.00777 |
| 0.95000 | 0.00538 | −0.00304 |
| 1.00000 | 0.00236 | −0.00095 | leading edge radius r/C=0.0096 center of circle X/C=0.0097, Y/C=−0.0018

Accordingly, the maximum lift coefficient Clmax is large in a wide velocity range from lower velocity to higher velocity, and reduction of noise level and pitching moment can be achieved.

6 Claims, 8 Drawing Sheets

U.S. PATENT DOCUMENTS

| | | |
|---|---|---|
| 5,609,472 | 3/1997 | Obukata et al. . |
| 5,791,878 * | 8/1998 | Wainauski et al. ............... 416/223 R |
| 5,957,662 | 9/1999 | Aoki et al. . |
| 5,961,290 * | 10/1999 | Aoki et al. ........................ 416/223 R |
| 6,164,918 * | 12/2000 | Aoki et al. ........................ 416/223 R |

FOREIGN PATENT DOCUMENTS

| | | |
|---|---|---|
| 63-64894 | 3/1988 | (JP) . |
| 8-40392 | 2/1996 | (JP) . |
| 9-240593 | 9/1997 | (JP) . |
| 10-226397 | 8/1998 | (JP) . |
| 11-124093 | 5/1999 | (JP) . |

* cited by examiner

FIG. 5B
12%-AEROFOIL

FIG. 5A
10%-AEROFOIL

FIG.8B DURING HORIZONTAL FLIGHT

FIG.8A DURING HOVERING

HELICOPTER BLADE AEROFOIL AND HELICOPTER BLADE

BACKGROUND OF THE INVENTION

1. Field of the Invention

The present invention relates to a helicopter blade aerofoil and a helicopter blade.

2. Description of the Related Art

In Japanese Patent Application No. 9-30730 (Japanese Unexamined Patent Publication JP-A 10-226397 (1998)) corresponding to U.S. Pat. No. 5,961,290, the Applicant of the present invention proposed an aerofoil AK100D as the prior application having large maximum lift coefficient Clmax and lift-drag ratio and reduced noise level.

Another prior art of the helicopter blade aerofoils are known Japanese Unexamined Patent Publications JP-A 50-102099 (1975), JP-A 59-134096 (1984), JP-A 63-64894 (1988), Japanese Examined Patent Publication JP-B2 62-34600 (1987), Japanese Patent Application No. 8-52121 (Japanese Unexamined Patent Publication JP-A 9-240593 (1997)) corresponding to U.S. Pat. No. 5,957,662, etc.

The aerofoil AK100D (the prior application), having excellent lift characteristics, drag characteristics, and lift-drag characteristics, especially superior lift characteristics at low velocities, in which a reduced noise level can be achieved. However it has a tendency that the maximum lift coefficient in a middle velocity range of Mach numbers M of 0.5 to 0.6 is small.

When a helicopter with a rotor having a radius R which is rotating at a rotational angular velocity $\Omega$ flies at a ground velocity V, the airspeeds of an advancing blade where the rotational speed of the rotor is added to the ground velocity V, and a retreating blade where the ground velocity V is subtracted from the rotational speed of the rotor are significantly different from each other. The operating envelope of helicopter blades thus exist in a wide range from lower velocity to higher velocity. In order to improve the performance of the rotor as a whole, therefore, it is necessary to improve the lift characteristics in wider velocity range.

SUMMARY OF THE INVENTION

It is an object of the invention to provide a helicopter blade aerofoil and helicopter blade having a large maximum lift coefficient Clmax in wide velocity range from lower velocity to higher velocity, and a reduced noise level.

It is another object of the invention to provide a helicopter blade aerofoil and helicopter blade having a large maximum lift coefficient Clmax in a wide range form lower velocity to higher velocity, and a reduced noise level, in which pitching moment about an aerodynamic center of the aerofoil can be reduced.

The invention provides a helicopter blade aerofoil having coordinate values within ±3% errors of upper and lower surfaces on the basis of a reference aerofoil having a thickness to chord ratio of 10% (hereinafter, referred to as aerofoil AK100G), of which upper and lower surfaces are substantially defined by the following coordinates, and of which leading edge profile is substantially defined by the following leading edge radius and center of a circle:

| X/C | Yup/C | Ylow/C |
|---|---|---|
| 0.00000 | 0.00000 | −0.00000 |
| 0.00100 | 0.00511 | −0.00584 |
| 0.00250 | 0.00843 | −0.00813 |
| 0.00500 | 0.01218 | −0.01014 |
| 0.00750 | 0.01505 | −0.01136 |
| 0.01000 | 0.01747 | −0.01218 |
| 0.01250 | 0.01959 | −0.01277 |
| 0.01500 | 0.02150 | −0.01328 |
| 0.01750 | 0.02325 | −0.01375 |
| 0.02000 | 0.02487 | −0.01415 |
| 0.02500 | 0.02780 | −0.01483 |
| 0.05000 | 0.03891 | −0.01714 |
| 0.07500 | 0.04682 | −0.01862 |
| 0.10000 | 0.05291 | −0.01979 |
| 0.15000 | 0.06152 | −0.02206 |
| 0.20000 | 0.06666 | −0.02470 |
| 0.25000 | 0.06892 | −0.02729 |
| 0.30000 | 0.06895 | −0.02949 |
| 0.35000 | 0.06841 | −0.03109 |
| 0.40000 | 0.06744 | −0.03211 |
| 0.45000 | 0.06568 | −0.03270 |
| 0.50000 | 0.06301 | −0.03272 |
| 0.55000 | 0.05943 | −0.03211 |
| 0.60000 | 0.05498 | −0.03084 |
| 0.65000 | 0.04968 | −0.02883 |
| 0.70000 | 0.04349 | −0.02600 |
| 0.75000 | 0.03649 | −0.02237 |
| 0.80000 | 0.02886 | −0.01794 |
| 0.85000 | 0.02087 | −0.01315 |
| 0.90000 | 0.01279 | −0.00777 |
| 0.95000 | 0.00538 | −0.00304 |
| 1.00000 | 0.00236 | −0.00095 |

Leading edge radius r/C=0.0096,
Center of circle X/C=0.0097, Y/C=−0.0018,
where X is a distance from the leading edge to a trailing edge along a chord line of the aerofoil, C is a length of the aerofoil in the chord direction, Yup is a distance from the chord line to the upper surface, Ylow is a distance from the chord line to the lower surface, and r is the leading edge radius.

According to the invention, since the leading edge upper surface contour, the leading edge radius, and the camber line are optimized in comparison with a conventional symmetric blade having a thickness to chord ratio of 10% (e.g., NACA0010), the pressure distribution in the upper surface of the aerofoil is flattened, and the level of the main rotor rotational noise can be reduced by several dB from that of the prior art. Moreover, the maximum lift coefficient Clmax is greatly improved.

Moreover, the aerofoil AK100G according to the present invention can realize an improvement of the maximum lift coefficient Clmax in a wide range of velocities in comparison with an aerofoil AK100D (the prior application). Thus, the operating envelope of the helicopter blade can be extended, and the flight performance of the helicopter is improved. In particular, the maximum lift coefficient Clmax in a middle velocity range is improved, so that the hovering performance of the helicopter is greatly improved.

Furthermore, the invention provides a helicopter blade aerofoil having coordinates values with ±3% errors of upper and lower surfaces, defined by a thickness to chord ratio within a range from 8% to 15% on the basis of the aerofoil AK100G. According to the present invention, an aerofoil AK080G having a thickness to chord ratio of 8% is obtained by multiplying the values of Yup/C and Ylow/C by 8/10 for all chord lines X/C on the basis of the aerofoil AK100G having a thickness to chord ratio of 10%, and on the other hand, an aerofoil AK150G having a thickness to chord ratio of 15% is obtained by multiplying the values by 15/10.

Therefore, similar effect can be achieved with any aerofoil having a thickness ratio within a range from 8% to 15%, obtained by multiplying a constant factor for the reference aerofoil (AK100G).

Furthermore, the present invention provides a helicopter blade aerofoil having coordinates values with ±3% errors of upper and lower surfaces, the helicopter blade aerofoil including, on the basis of the aerofoil AK100G, a trailing edge tab having a length of 5% to 10% of a chord length of the aerofoil and a tab angle in a range of 0 to 5 degrees in a trailing edge elevating direction with respect to a chord line in a trailing edge of the aerofoil (hereinafter, the aerofoil with such a trailing edge tab is referred to as AK100G-TAB).

According to the present invention, an aerofoil having a trailing edge tab of a predetermined length can be obtained by multiplying the aerofoil AK100G by an arbitrary reduction ratio, and adding a trailing edge tab having an arbitrary thickness.

Therefore, while maintaining the superior characteristics of the aerofoil AK100G, a pitching moment Cm can be reduced by adding a tab having a predetermined tab angle and a predetermined length to the trailing edge of the aerofoil AK100G. When the trailing tab is bent in the range of 0 to 5 degrees (in the trailing edge elevating direction), a pitching down moment reduction effect can be attained in accordance with the tab angle. The aerofoil including the trailing edge tab having a length in the range of 5 to 10% of the chord length can attain a pitching moment reduction effect in accordance with the tab length.

Furthermore, the present invention provides a helicopter blade aerofoil having coordinates values with ±3% errors of upper and lower surfaces, defined by a thickness to chord ratio within a range from 8% to 15% on the basis of the aerofoil AK100G-TAB.

According to the present invention, an aerofoil AK080G-TAB having a thickness to chord ratio of 8% is obtained by multiplying the values of Yup/C and Ylow/C by 8/10 for all chord lines X/C on the basis of the aerofoil AK100G-TAB having a thickness to chord ratio of 10%, and on the other hand, an aerofoil AK150G-TAB having a thickness to chord ratio of 15% is obtained by multiplying the values by 15/10. Therefore, similar effect can be achieved with any aerofoil having a thickness ratio within a range from 8% to 15%, obtained by multiplying a constant factor for the reference aerofoil (AK100G-TAB).

Furthermore, the present invention provides a helicopter blade formed so as to have a thickness to chord ratio varying in a spanwise direction, by making use of an aerofoil defined by a thickness to chord ratio within a range from 8% to 15% on the basis of the aerofoil AK-100G or AK100G-TAB.

According to the present invention, when an aerofoil having a relatively large thickness to chord ratio, for example, an aerofoil AK120G is disposed from a blade root portion to a blade center portion and an aerofoil having a relatively small thickness to chord ratio, for example, the aerofoil AK100G is disposed in a blade tip portion, the maximum lift coefficient Clmax of the helicopter blade as a whole can be improved in a wide range from lower velocity to higher velocity. Therefore, the operating envelope of the helicopter blade can be expanded, which provides an improvement in flight performance of helicopter.

BRIEF DESCRIPTION OF THE DRAWINGS

Other and further objects, features, and advantages of the invention will be more explicit from the following detailed description taken with reference to the drawings wherein:

FIGS. 5A and 5B are graphical representations of the characteristics of maximum lift coefficient Clmax of an aerofoil according to the invention, in which FIG. 5A shows an aerofoil having a thickness to chord ratio of 10%, and FIG. 5B shows an aerofoil having a thickness to chord ratio of 12%;

FIGS. 8A and 8B are graphical representations of the relationships between operating conditions of a blade and the aerofoil performance, in which FIG. 8A shows relationships during hovering between the local lift distribution on a blade and the aerofoil performance, and FIG. 8B shows relationships during horizontal flight between the blade operating envelope and the aerofoil performance;

FIGS. 9A to 9C are graphical representations of the comparison of rotational noise generated by rotor blades, in which FIG. 9A shows rotational noise related to an aerofoil AK120G according to the present invention, FIG. 9B shows rotational noise related to a conventional aerofoil NACA0012, and FIG. 9C shows helicopter and observer point;

FIGS. 10A to 10C are graphical representations of the distribution of surface pressure Cp at a Mach number of 0.6 of an aerofoil AK100G according to the present invention, in which FIG. 10A shows the surface pressure distribution at an angle of attack α of 2 degrees, FIG. 10B shows the surface pressure distribution at an angle of attack α of 4 degrees, and FIG. 10C shows the surface pressure distribution at an angle of attack α of 6 degrees; and FIGS. 11A to 11C are graphical representation of the distribution of surface pressure Cp at a Mach number of 0.6 of an aerofoil AK100D (the prior application), in which FIG. 11A shows the surface pressure distribution at an angle of attack α of 2 degrees, FIG. 11B shows the surface pressure distribution at an angle of attack α of 4 degrees, and FIG. 11C shows the surface pressure distribution at an angle of attack α of 6 degrees.

DETAILED DESCRIPTION OF THE PREFERRED EMBODIMENTS

Now referring to the drawings, preferred embodiments of the invention are described below.

Figure 1:
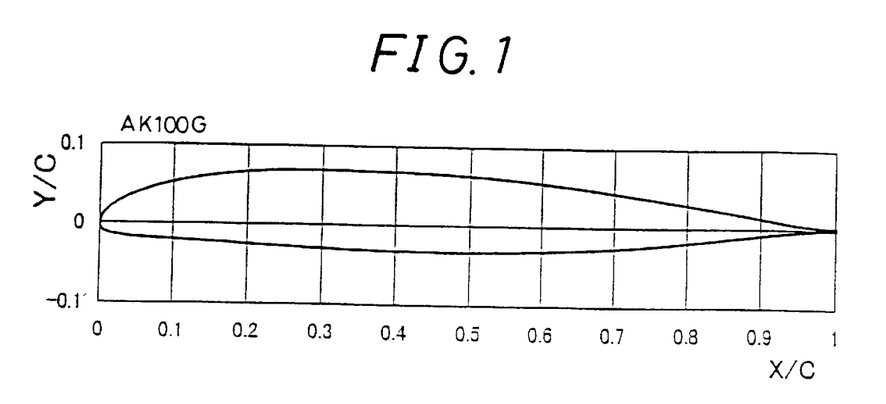
FIG. 1 is a graphical representation of an aerofoil AK100G of an embodiment of the invention.
Figure 2:
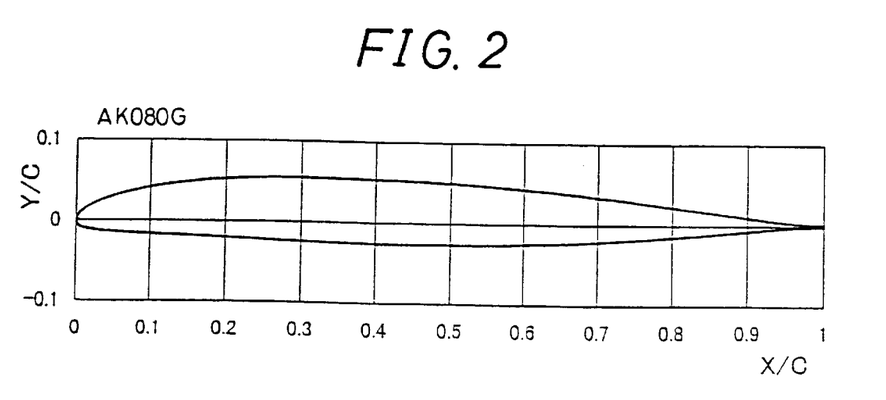
FIG. 2 is a graphical representation of an aerofoil AK080G of another embodiment of the invention.
Figure 3:
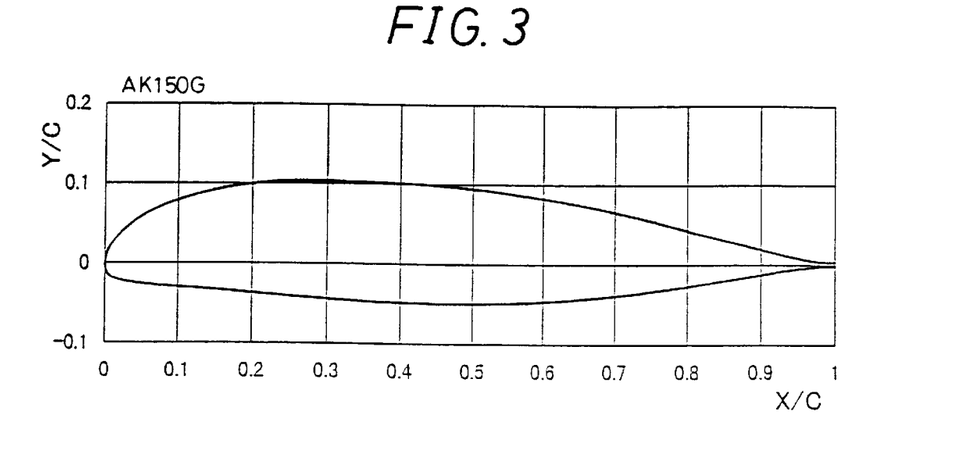
FIG. 3 is a graphical representation of an aerofoil AK150G of a further embodiment of the invention.
Figure 4:
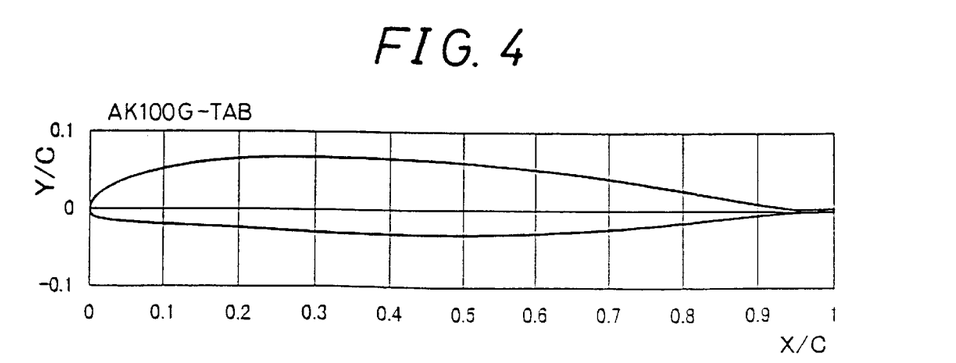
FIG. 4 is a graphical representation of an aerofoil AK100G-TAB of a still another embodiment of the invention.

FIGS. 1 to 4 are graphical representations of embodiments of the present invention. FIG. 1 shows an aerofoil AK100G, FIG. 2 shows an aerofoil AK080G, FIG. 3 shows an aerofoil AK150G, and FIG. 4 shows an aerofoil AK100G-TAB (having a trailing edge tab angle of 1 degree, and a trailing edge tab length of 5% of a chord length of the aerofoil).

In the aerofoil AK100G of the present invention, the leading edge upper surface contour, the leading edge radius, and the camber line are optimized. Therefore, the pressure distribution over the upper surface of the aerofoil is flattened while, particularly, the peak pressure around the leading edge is suppressed, so that the entire pressure distribution is flattened as compared with a conventional symmetric aerofoil (for example, NACA0010). As a result, the level of the main rotor rotational noise can be reduced by several dB over the prior art.

The aerofoil AK100G of the present invention can realize an improvement of the maximum lift coefficient Clmax in a wider velocity range, compared to the aerofoil AK100D (the prior application). Accordingly, the operating envelope of the helicopter blade can be expanded, and the flight performance of a helicopter is improved. In particular, the maximum lift coefficient Clmax in the middle velocity range is improved, so that the hovering performance of the helicopter is remarkably improved.

Figure 5A:
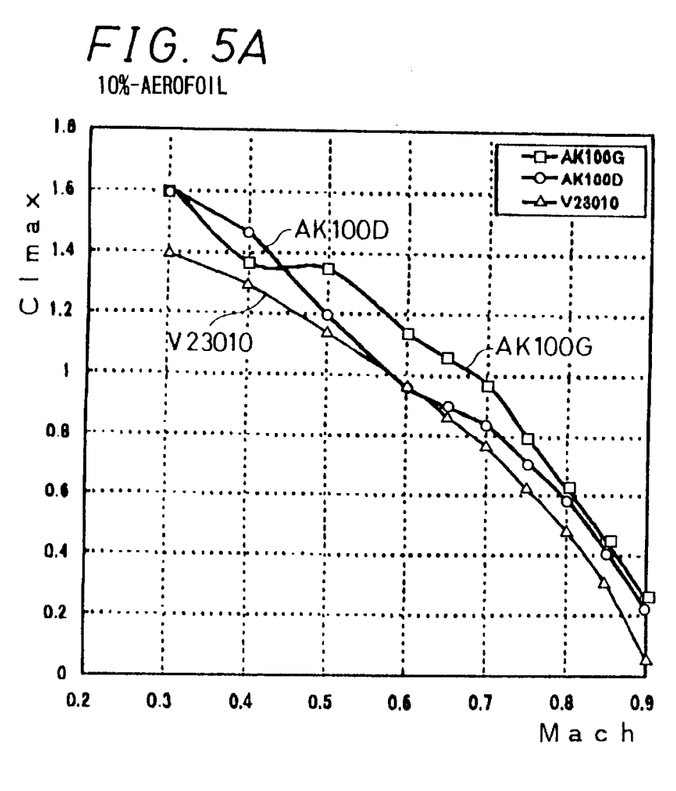
Figure 5B:
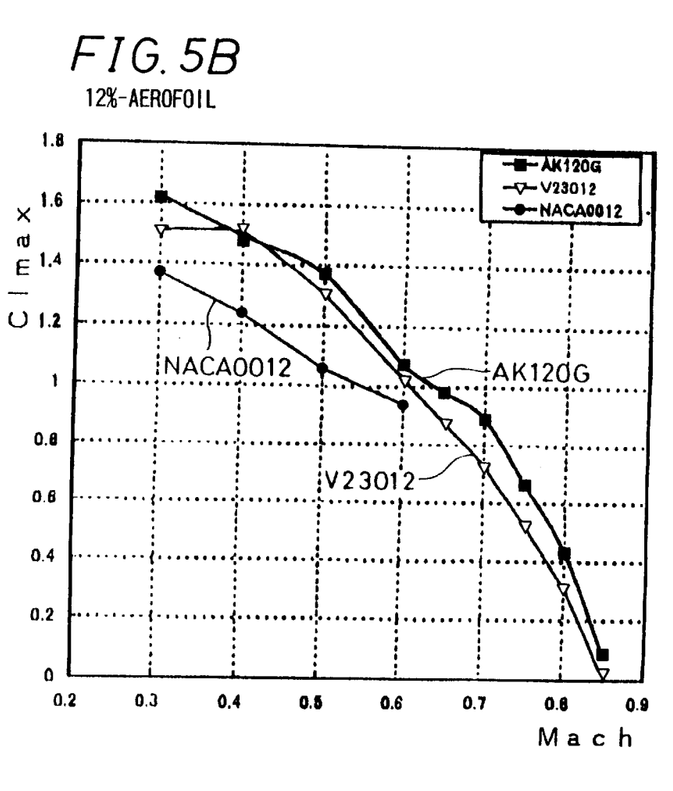

FIGS. 5A and 5B are graphical representations of the characteristics of maximum lift coefficient Clmax of aerofoils according to the invention. FIG. 5A shows the characteristics of an aerofoil having a thickness to chord ratio of 10%, and FIG. 5B shows the characteristics of an aerofoil having a thickness to chord ratio of 12%. The axis of abscissas represents Mach number M (airspeed), and the axis of ordinates represents maximum lift coefficient Clmax.

When a helicopter flies at a ground velocity V, a Mach number of 0.85 is achieved at an advancing blade tip where the ground velocity V is added, and a Mach number M of about 0.3 is obtained at a retreating blade tip where the ground velocity V is subtracted. Thus, at the azimuth angle $\Psi$ of 0 degree and 180 degrees at which a blade is parallel to the flight direction, and does not depend on the ground velocity V, so that the Mach number M is about 0.6 (Cat $\Psi=0°$ and $\Psi=180°$). In the hovering flight in which the helicopter remains at rest in the air, the ground velocity V is 0, so that the Mach number is about 0.6 at an arbitrary azimuth angle $\Psi$.

FIG. 5A is related to aerofoils having a thickness to chord ratio of 10%. In the figure, the curve depicted by hollow squares □ is related to the aerofoil AK100G of the present invention. The other curves are related to comparative aerofoils. The curve depicted by hollow circles ○ is related to the aerofoil AK100D (the prior application), and the curve depicted by hollow triangles Δ is related to the aerofoil V23010 (having a thickness to chord ratio of 10%).

As seen from the graphs, the aerofoil AK100D which was proposed by the Applicant as the prior application has improved maximum lift coefficients Clmax in the regions of low Mach numbers and high Mach numbers, as compared with the conventional aerofoil V23010. However, the maximum lift coefficients Clmax in the middle velocity range in the vicinity of a Mach number of 0.5 to 0.7 are not so largely improved. By contrast, in the aerofoil AK100G according to the present invention, a slight recess is observed at a Mach number M of 0.4, but it is seen that the maximum lift coefficients Clmax in the middle and higher velocity ranges of Mach numbers M of 0.5 to 0.9 are significantly improved.

FIG. 5B is related to aerofoils having a thickness to chord ratio of 12%. In the figure, the curve depicted by solid squares ■ is related to the aerofoil AK120G of the present invention. The other curves are related to comparative aerofoils. The curve depicted by inverted hollow triangles ▽ is related to the aerofoil V23012 (having a thickness to chord ratio of 12%), and the curve depicted by solid rhombuses ◆ is related to the aerofoil NACA0012 (having a thickness to chord ratio of 12%).

As seen from the graphs, the aerofoil AK120G according to the present invention has improved maximum lift coefficients Clmax in the entire Mach region, as compared with the conventional aerofoils V23012 and NACA0012. In particular, the aerofoil AK120G is superior also in the lower velocity range of Mach numbers M of 0.3 to 0.5.

In the aerofoil AK100G, the maximum lift coefficient Clmax at a Mach number of 0.5 is substantially equal to that of the aerofoil AK120G, but the superior maximum lift coefficient Clmax at a Mach number of 0.6 or higher is obtained.

Consequently, the aerofoil AK120G is suitable for an aerofoil from a blade root portion to a blade center portion in which the Mach number is not so high, and the aerofoil AK100G which has superior performance at middle and higher velocities is suitable for an aerofoil of a blade tip portion.

Figure 6:
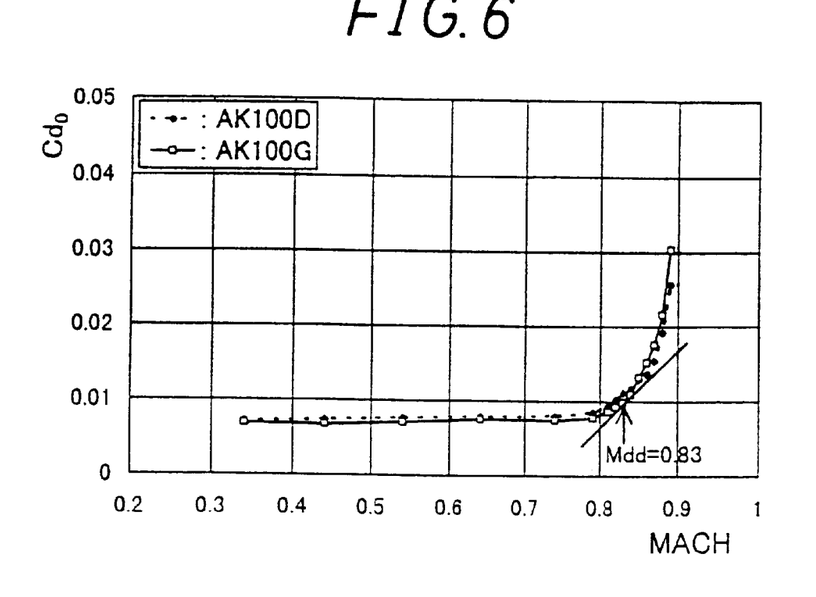
FIG. 6 is a graphical representation of drag characteristics of an aerofoil according to the invention.

FIG. 6 is a graphical representation of drag characteristics of the aerofoils according to the invention. The axis of abscissas represents Mach number M (airspeed), and the axis of ordinates represents drag coefficient Cd0 (drag coefficient Cd at a lift coefficient Cl of 0). Drag divergence Mach number Mdd which is one of parameters for evaluation of blade is defined by Mach number at which a value $\Delta Cd/\Delta M$ obtained by dividing an increment $\Delta Cd$ of the drag coefficient Cd by an increment $\Delta M$ of the Mach number is 0.1.

As seen from the graph, drag characteristics of the aerofoils AK100G (the present invention) and AK100D (the prior application) substantially agree to each other, and an excellent drag divergence Mach number Mdd of 0.83 is obtained for both aerofoils.

Figure 7:
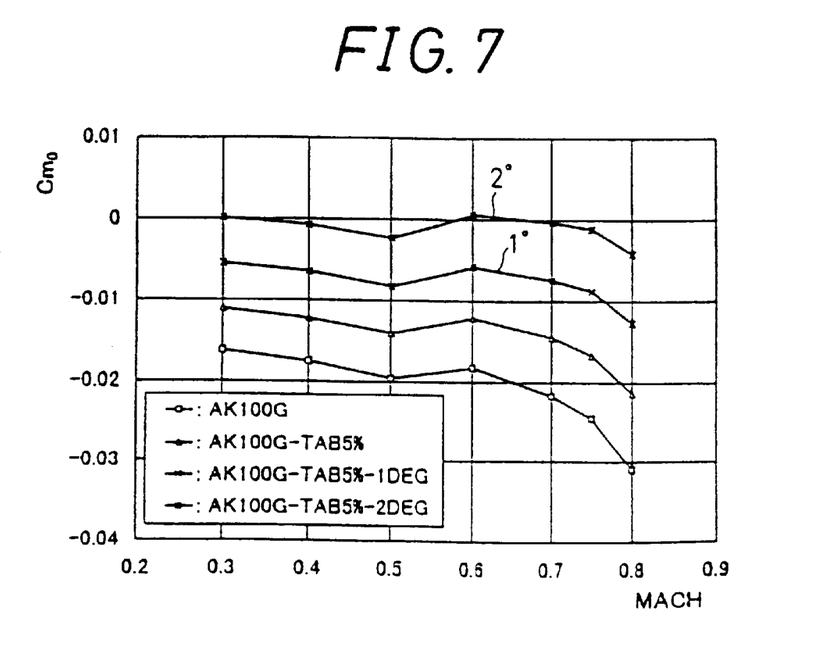
FIG. 7 is a graphical representation of pitching moment characteristics of an aerofoil according to the invention.

FIG. 7 is a graphical representation of pitching moment characteristics of the aerofoils according to the invention. The axis of abscissas represents Mach number M (airspeed), and the axis of ordinates represents pitching moment coefficient Cm0 at a lift coefficient Cl of 0). The curves correspond to the aerofoil AK100G, an aerofoil AK100G-TAB5% in which the trailing edge tab has a length of 5% of the chord length and the tab angle is parallel to the chord line, an aerofoil AK100G-TAB5%-1DEG in which the trailing edge tab has a length of 5% of the chord length and the tab angle is 1 degree with respect to the chord line in the trailing edge elevating direction, and an aerofoil AK100G-TAB5%-2DEG in which the trailing edge tab has a length of 5% of the chord length and the tab angle is 2 degrees with respect to the chord line in the trailing edge elevating direction, respectively.

The pitching moment Cm is a moment acting in directions in which the leading edge is moved upward (+) and downward (−) about the aerodynamic center of the aerofoil. When the pitching moment Cm increases, the pitching moment affects the twisting deformation of a blade to impair blade control characteristics, and a load which is to be supported by the blade control system (for example, a swash plate and actuators) increases, so that the size and weight of the control system are disadvantageously increased. Accordingly, a blade having a pitching moment Cm closer to zero is regarded as a good blade.

As seen from the graphs, the aerofoil AK100G having no trailing edge tab exhibits a Cm of about −0.02. When the trailing edge tab is added, the pitching moment Cm decreases. When a predetermined tab angle is additionally applied in the trailing edge elevating direction, the pitching moment Cm further decreases. The pitching moment can be reduced to almost zero at the tab angle of 2 degrees.

Figure 8A:
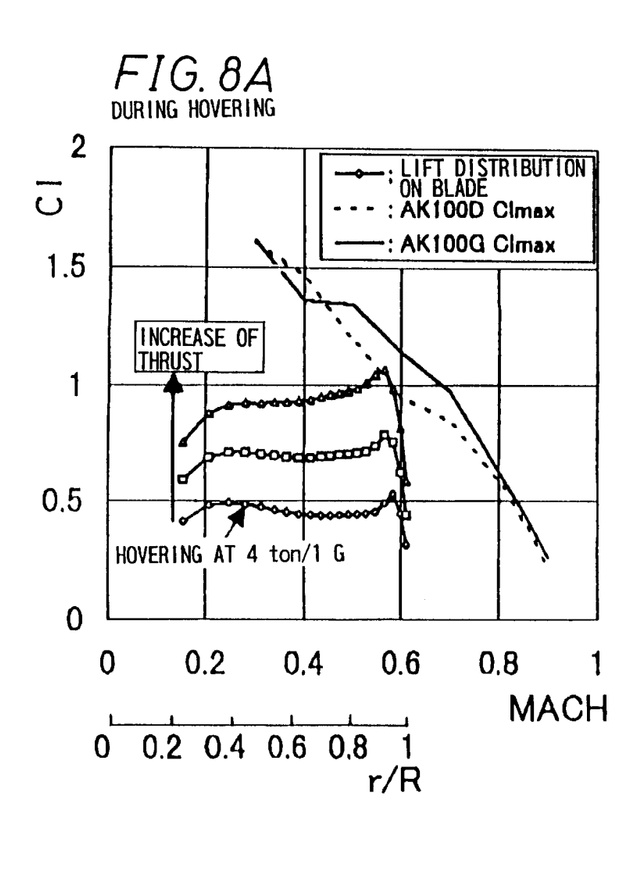
Figure 8B:
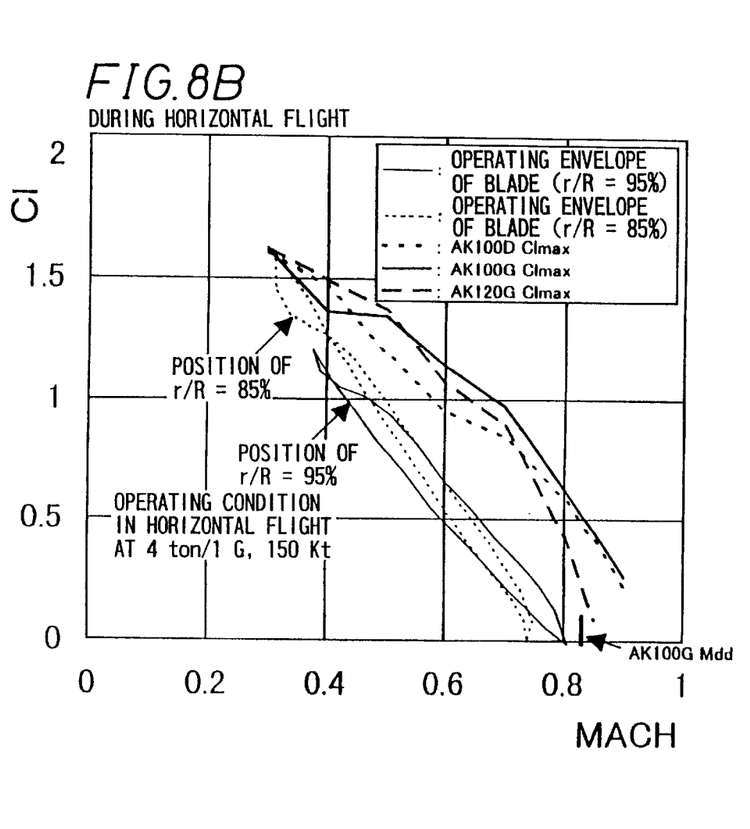

FIGS. 8A and 8B are graphical representations of the relationships between operating conditions of blade and aerofoil performances. FIG. 8A shows the relationships during hovering, and FIG. 8B shows the relationships during horizontal flight. The axis of abscissas represents Mach number M (airspeed), and the axis of ordinates represents local lift coefficient Cl of the blade.

FIG. 8A shows the relationships between local lift distribution on a blade and aerofoil performances during hovering. During hovering, the ground speed V is zero. Since the Mach number M is proportional to the blade spanwise position, a normalized radius r/R which is obtained by normalizing the radius r from the blade root by the whole blade length R when the Mach number M in a blade tip position is about 0.62 is also shown along the axis of abscissas.

As seen from the graph, the local lift coefficient Cl is substantially flat in a blade center portion (r/R=0.3 to 0.8), and the local lift coefficient Cl reaches its peak at a position slightly inside from the blade tip. As a thrust increases, the local lift acting on the blade increases, and the peak of the local lift coefficient also increases. When the peak of the local lift coefficient Cl of the blade exceeds the maximum lift coefficient Clmax of the aerofoil, blade stall starts. Therefore, it is absolutely necessary to prevent blade stall from occurring, and a helicopter can fly only in the region in which the local lift coefficient is lower than the maximum lift coefficient Clmax of the aerofoil. In the Clmax characteristics of the aerofoil AK100D (the prior application), as described above, the maximum lift coefficient Clmax is enhanced in the lower velocity range and in the higher velocity range, but, in the middle velocity range of Mach numbers M of 0.5 to 0.7, the enhancement is not enough. Accordingly, as the thrust increases, there arises a possibility that the local lift on a blade of a range of Mach numbers M of 0.5 to 0.6 exceeds the maximum lift coefficient Clmax of the aerofoil. As contrasted with AK100D, in the aerofoil AK100G according to the present invention, the maximum lift coefficient Clmax is superior in the middle and higher velocity ranges of Mach numbers M of 0.5 to 0.9, so that a relatively large margin is retained between the peak value of the local lift coefficient Cl and the maximum lift coefficient Clmax. The margin of the aerofoil performances with respect to the increased thrust improves the handling of the helicopter during hovering, and the gross weight of the helicopter and the hovering altitude can be increased. With this margin, the climbing performance, accelerating performance, and turning performance of the helicopter can be greatly improved.

FIG. 8B shows relationships between blade operating envelope and aerofoil performances during horizontal flight at 150 Kt. As seen from the graph, a blade operates in a very wide range from low Mach number to high Mach number. As described above, when the blade operating envelope exceeds the maximum lift coefficient Clmax of an aerofoil, blade stall starts. In order to improve the performance of the helicopter, it is necessary to improve the maximum lift coefficient Clmax of an aerofoil in a wide range of Mach numbers. The aerofoil AK100G according to the present invention has the higher maximum lift coefficient Clmax in a wider range of Mach numbers, as compared with the aerofoil AK100D (the prior application). Thus, the performance of the helicopter can be further improved.

As described above, the aerofoil AK100G has superior lift characteristics in the middle and higher velocity ranges of Mach numbers of 0.5 to 0.9. The aerofoil AK120G has superior lift characteristics in the lower velocity range of Mach numbers of 0.3 to 0.5. Accordingly, the aerofoil AK120G which has superior lift characteristics in the lower velocity range is disposed as an aerofoil from a root portion to a center portion of a blade in which the Mach number does not become so high, and the aerofoil AK100G which has the superior lift characteristics in the middle and higher velocity ranges is disposed as an aerofoil on a blade tip portion in which the Mach number becomes high. With this configuration, the operating envelope of helicopter blade can be further expanded, and the flight performance of the helicopter can be further improved. Referring to FIG. 8B, as shown in the operating envelope of a spanwise position r/R of 95%, for example, the aerofoil AK100G having superior lift characteristics in the middle and higher velocity ranges is disposed in the vicinity of the blade tip. As shown in the operating envelope of a spanwise position r/R of 85%, the aerofoil AK120G in which Clmax is high in the lower velocity range and a thickness to chord ratio is relatively large is disposed in a region where a high Clmax is required in the lower velocity range. With this configuration, the operating envelope of helicopter blade can be expanded. By disposing aerofoils on a blade in this way so as to extract the superior lift characteristics of respective thickness to chord ratios, the maximum lift coefficient Clmax can be increased in the whole range of Mach numbers in which the helicopter blade operates, so that the operating envelope can be expanded. Thus, the flight performance of the helicopter is further improved.

Figure 9A:
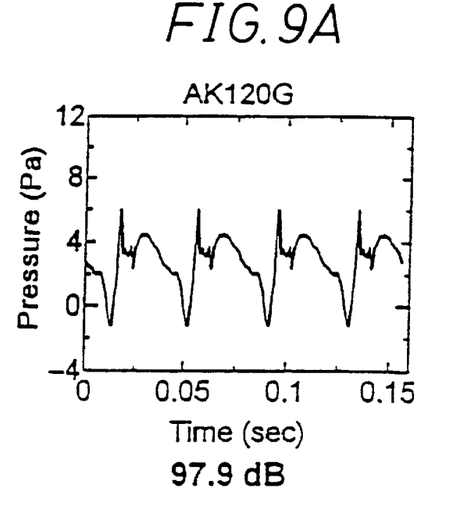
Figure 9B:
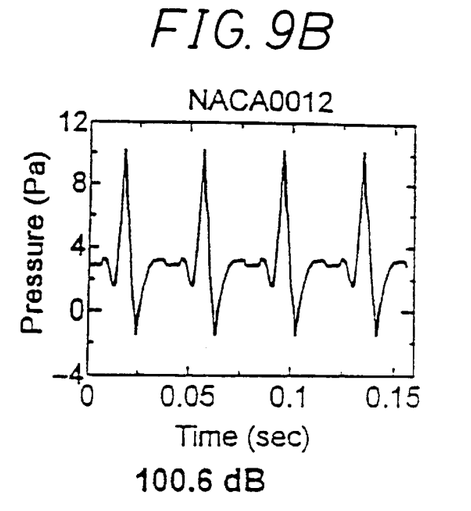
Figure 9C:
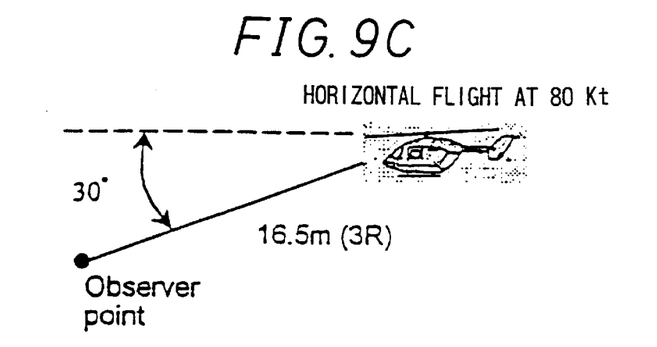

FIGS. 9A to 9C are graphical representations of the comparison of rotational noises generated by rotor blades. FIG. 9A shows rotational noise related to an aerofoil AK120G according to the present invention, and FIG. 9B shows rotational noise related to a conventional aerofoil NACA0012. The axis of abscissas represents elapsed times, and the axis of ordinates represents sound pressure value (in units of Pascal Pa, in linear) at the observer point as shown in FIG. 9C, so that the graph shows the waveform of rotational noises. The observer point is placed in a position of 16.5 m (corresponding to three times the blade radius R) at a downward angle of 30 degrees with respect to the flight direction, when the helicopter flies at a ground velocity V of 80 kt (knots).

As seen from the graph, the sound pressure value as a whole tends to periodically fluctuate due to the rotation of blade. As for the conventional aerofoil NACA0012, periodic fluctuations appear as spikes, and the noise level is assumed to be 100.6 dB. However, as for the aerofoil AK120G of the present invention, it is seen that large spikes are suppressed, the amplitude of a sound pressure peak is reduced to about one half, and the noise level is assumed to be 97.9 dB or the rotational noise is reduced by about 3 dB.

Figure 10A:
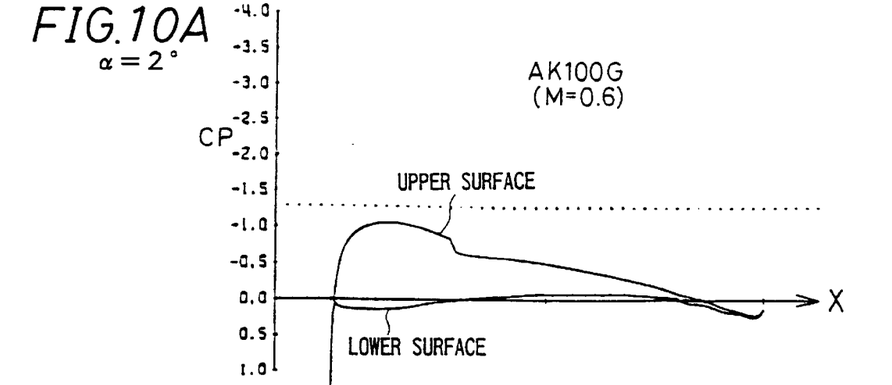
Figure 10B:
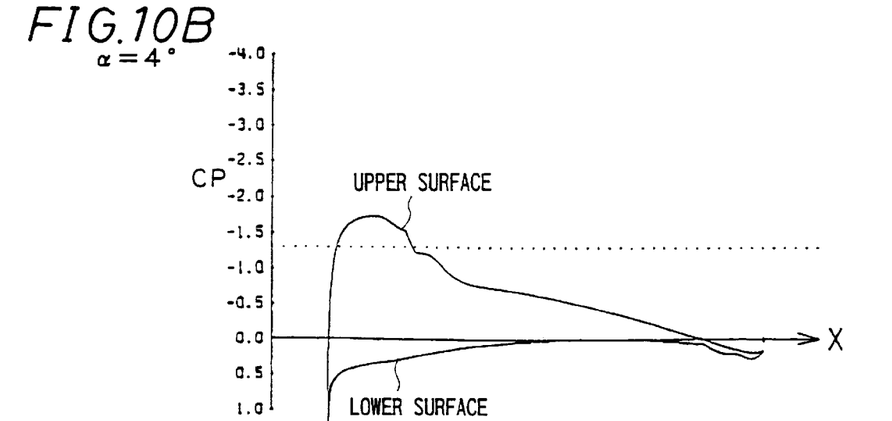
Figure 10C:
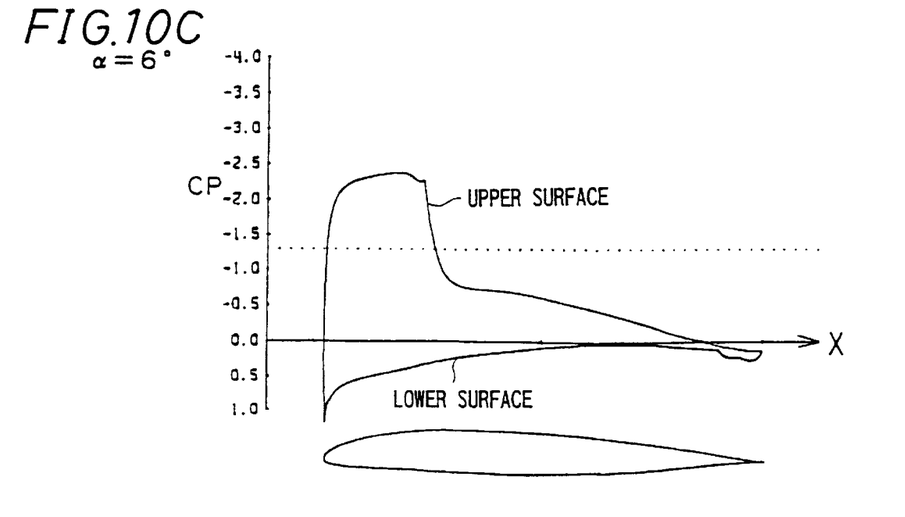

FIGS. 10A to 10C are graphical representations of the distribution of surface pressure Cp at a Mach number of 0.6 of the aerofoil AK100G according to the present invention. FIG. 10A shows the pressure distribution at an angle of attack α of 2 degrees, FIG. 10B shows that at an angle of attack α of 4 degrees, and FIG. 10C shows that at an angle of attack α of 6 degrees.

Figure 11A:
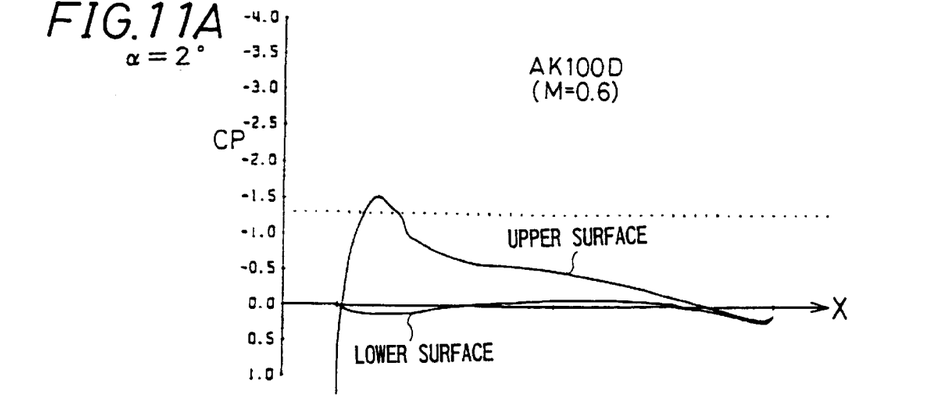
Figure 11B:
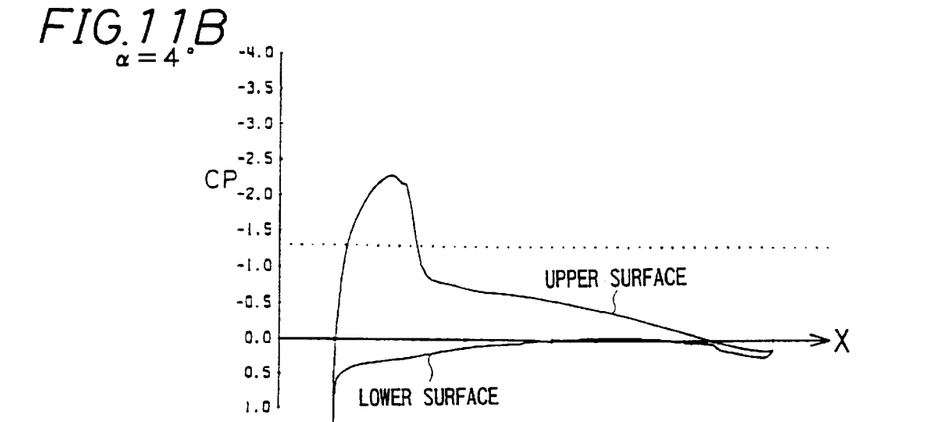
Figure 11C:
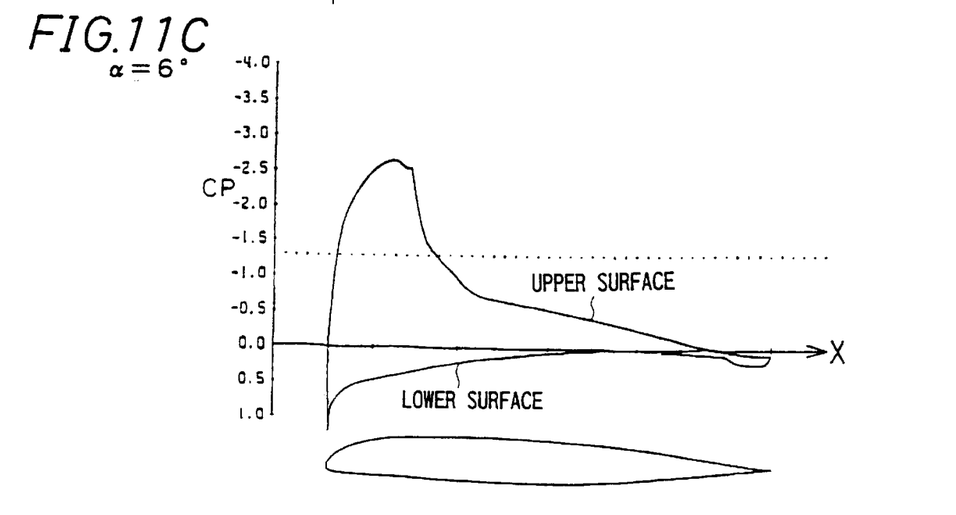

FIGS. 11A to 11C are graphical representations of the distribution of surface pressure Cp at a Mach number of 0.6 of the aerofoil AK100D (the prior application). FIG. 11A shows the distribution at an angle of attack α of 2 degrees, FIG. 11B shows that at an angle of attack α of 4 degrees, and FIG. 11C shows that at an angle of attack α of 6 degrees. In FIGS. 10A to 10C, and 11A to 11C, the axis of ordinates represents surface pressure Cp in the negative direction, and the axis of abscissaas represents distance X from a leading edge toward a trailing edge along the chord line of an aerofoil.

As seen from FIGS. 10A to 10C, in the aerofoil AK100G according to the present invention, the peak of the negative pressure in the vicinity of an upper surface of a leading edge where negative pressure increases together with the increase in angle of attack α is suppressed. In the conventional aerofoil, a large peak of the negative pressure appears in the vicinity of an upper surface of a leading edge where negative pressure peak is rapidly increased as the angle of attack α is increased, so that a flow separation is induced and finally blade stall occurs. In the aerofoil of the invention, a droop is provided in a leading edge portion, and the contour of the upper surface of the leading edge is optimized, thereby suppressing the rapid rise of the negative pressure peak. Accordingly, the formation of a negative pressure peak together with the increase in angle of attack α is suppressed; the flow separation is delayed; and the stall angle of attack and the maximum lift coefficient Clmax are increased. As a result, as shown in FIG. 5, the maximum lift coefficient Clmax is improved in a wide range of Mach numbers, the operating envelope of a helicopter blade is greatly expanded, and the performance of a helicopter can be improved, as compared with the conventional aerofoil.

In the aerofoil AK100D which was proposed by the Applicant as the prior application and which is shown in FIGS. 11A to 11C, the negative pressure peak is suppressed, and the lift characteristics in the lower velocity range of Mach numbers M of 0.3 to 0.5 are improved, as compared with a conventional symmetric aerofoil. In the aerofoil AK100G of the present invention, the negative pressure peak which is shown in FIGS. 10A to 10C is further suppressed, whereby the lift characteristics in the middle velocity range of Mach numbers M of 0.5 to 0.7 are greatly improved, as shown in FIGS. 8A and 8B. Moreover, as apparent from FIGS. 9A to 9C, by flattening the pressure distribution in the upper surface of the aerofoil, the level of the main rotor rotational noise can be reduced by several dB over the prior art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A helicopter blade aerofoil having coordinate values within ±3% errors of upper and lower surfaces on the basis of a reference aerofoil having a thickness to chord ratio of 10%, of which upper and lower surfaces are substantially defined by the following coordinates, and of which leading edge profile is substantially defined by the following leading edge radius and center of a circle:

| X/C | Yup/C | Ylow/C |
| --- | --- | --- |
| 0.00000 | 0.00000 | −0.00000 |
| 0.00100 | 0.00511 | −0.00584 |
| 0.00250 | 0.00843 | −0.00813 |
| 0.00500 | 0.01218 | −0.01014 |
| 0.00750 | 0.01505 | −0.01136 |
| 0.01000 | 0.01747 | −0.01218 |
| 0.01250 | 0.01959 | −0.01277 |
| 0.01500 | 0.02150 | −0.01328 |
| 0.01750 | 0.02325 | −0.01375 |
| 0.02000 | 0.02487 | −0.01415 |
| 0.02500 | 0.02780 | −0.01483 |
| 0.05000 | 0.03891 | −0.01714 |
| 0.07500 | 0.04682 | −0.01862 |
| 0.10000 | 0.05291 | −0.01979 |
| 0.15000 | 0.06152 | −0.02206 |
| 0.20000 | 0.06666 | −0.02470 |
| 0.25000 | 0.06892 | −0.02729 |
| 0.30000 | 0.06895 | −0.02949 |
| 0.35000 | 0.06841 | −0.03109 |
| 0.40000 | 0.06744 | −0.03211 |
| 0.45000 | 0.06568 | −0.03270 |
| 0.50000 | 0.06301 | −0.03272 |
| 0.55000 | 0.05943 | −0.03211 |
| 0.60000 | 0.05498 | −0.03084 |
| 0.65000 | 0.04968 | −0.02883 |
| 0.70000 | 0.04349 | −0.02600 |
| 0.75000 | 0.03649 | −0.02237 |
| 0.80000 | 0.02886 | −0.01794 |
| 0.85000 | 0.02087 | −0.01315 |
| 0.90000 | 0.01279 | −0.00777 |
| 0.95000 | 0.00538 | −0.00304 |
| 1.00000 | 0.00236 | −0.00095 |

Leading edge radius r/C=0.0096,

Center of circle X/C=0.0097, Y/C=−0.0018, where X is a distance from the leading edge to a trailing edge along a chord line of the aerofoil, C is a length of the aerofoil in the chord direction, Yup is a distance from the chord line to the upper surface, Ylow is a distance from the chord line to the lower surface, and r is the leading edge radius.

2. A helicopter blade aerofoil having coordinates values with ±3% errors of upper and lower surfaces, defined by a thickness to chord ratio within a range from 8% to 15% on the basis of the reference aerofoil having a thickness to chord ratio of 10% defined in claim 1.

3. A helicopter blade aerofoil having coordinates values with ±3% errors of upper and lower surfaces, the helicopter blade aerofoil including, on the basis of the reference aerofoil having a thickness to chord ratio of 10% defined in claim 1, a trailing edge tab having a length of 5% to 10% of a chord length of the aerofoil and a tab angle in a range of 0 to 5 degrees in a trailing edge elevating direction with respect to a chord line in a trailing edge of the aerofoil.

4. A helicopter blade aerofoil having coordinates values with ±3% errors of upper and lower surfaces, defined by a thickness to chord ratio within a range from 8% to 15% on the basis of the aerofoil of claim 3.

5. A helicopter blade formed so as to have a thickness to chord ratio varying in a spanwise direction, by making use of the aerofoil of claim 2.

6. A helicopter blade formed so as to have a thickness to chord ratio varying in a spanwise direction, by making use of the aerofoil of claim 4.

* * * * *